US011931756B1

(12) United States Patent
Leavitt

(10) Patent No.: US 11,931,756 B1
(45) Date of Patent: *Mar. 19, 2024

(54) SPRINKLER HEAD COVER

(71) Applicant: Gary Leavitt, Charlotte, NC (US)

(72) Inventor: Gary Leavitt, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/047,554

(22) Filed: Oct. 18, 2022

Related U.S. Application Data

(63) Continuation of application No. 16/989,112, filed on Aug. 10, 2020, now Pat. No. 11,504,734, which is a continuation-in-part of application No. 15/964,625, filed on Apr. 27, 2018, now Pat. No. 10,758,928, which is a continuation-in-part of application No. 14/538,528, filed on Nov. 11, 2014, now Pat. No. 10,369,584.

(51) Int. Cl.
*B05B 15/16* (2018.01)
*E01C 13/08* (2006.01)

(52) U.S. Cl.
CPC .............. *B05B 15/16* (2018.02); *E01C 13/08* (2013.01)

(58) Field of Classification Search
CPC ........ B05B 15/001; B05B 15/16; E01C 13/08
USPC .............................................. 239/288–288.5
See application file for complete search history.

(56) References Cited

U.S. PATENT DOCUMENTS

| | | | |
|---|---|---|---|
| 2,013,849 | A | 9/1935 | Keys |
| 2,757,045 | A | 7/1956 | Nullet |
| 3,015,448 | A | 1/1962 | Hurless |
| 3,511,501 | A | 5/1970 | Sandberg |
| 3,662,956 | A | 5/1972 | Hedman |
| 3,709,435 | A | 1/1973 | Sheets |
| 3,904,120 | A | 9/1975 | Sbicca |
| 4,010,901 | A | 3/1977 | Sheets |
| 4,014,502 | A | 3/1977 | Sheets |
| 4,034,787 | A | 7/1977 | Ellis |
| 4,350,296 | A | 9/1982 | Kuhlman et al. |
| 4,429,832 | A | 2/1984 | Sheets |
| 4,582,256 | A | 4/1986 | Jaquez |
| 5,037,030 | A | 8/1991 | Apodaca |
| 5,211,338 | A | 5/1993 | Leite et al. |
| 5,213,262 | A | 5/1993 | Violette |
| 5,222,669 | A | 6/1993 | Lawson |
| 5,308,075 | A | 5/1994 | Theriault |
| 5,678,353 | A | 10/1997 | Tsao et al. |
| 5,915,879 | A | 6/1999 | Burnett et al. |
| 5,931,385 | A | 8/1999 | Miller |
| 5,938,121 | A | 8/1999 | Ferguson et al. |
| 6,186,416 | B1 | 2/2001 | Jones |
| 6,439,476 | B1 | 8/2002 | Boggs |
| 6,494,386 | B1 | 12/2002 | Banu |
| 6,575,628 | B1 | 6/2003 | Borchardt et al. |
| 7,337,585 | B1 | 3/2008 | Bobbit |

(Continued)

FOREIGN PATENT DOCUMENTS

| | | | |
|---|---|---|---|
| GB | 2449895 | A | 12/2008 |
| JP | 7300871 | A | 11/1995 |
| JP | 1119266 | A | 1/1999 |

*Primary Examiner* — Christopher S Kim
(74) *Attorney, Agent, or Firm* — IPTechLaw

(57) ABSTRACT

Implementations of sprinkler head covers may include: an artificial turf portion including a backing, a stiffener coupled to the backing at a first side of the stiffener, and a bag removably coupled to a second side of the stiffener. The second side may be opposite the first side of the stiffener.

20 Claims, 7 Drawing Sheets

(56) References Cited

U.S. PATENT DOCUMENTS

| | | | | |
|---|---|---|---|---|
| 8,616,467 | B1 | 12/2013 | Leavitt | |
| 10,369,584 | B1 * | 8/2019 | Leavitt .................... | E01C 13/08 |
| 10,758,928 | B1 * | 9/2020 | Leavitt .................... | B05B 15/16 |
| 11,504,734 | B1 * | 11/2022 | Leavitt .................... | B05B 15/16 |
| 2002/0136846 | A1 | 9/2002 | Prevost | |
| 2004/0211129 | A1 | 10/2004 | Sannipoli, Sr. et al. | |
| 2009/0181782 | A1 | 7/2009 | Knox | |

* cited by examiner

SPRINKLER HEAD COVER

CROSS REFERENCE TO RELATED APPLICATIONS

This application is a continuation application of the earlier U.S. Utility Patent Application to Leavitt entitled "Sprinkler Head Cover," application Ser. No. 16/989,112, filed Aug. 10, 2020, now pending, which application is a continuation-in-part application of the earlier U.S. Utility Patent Application to Leavitt entitled "Sprinkler Head Cover," application Ser. No. 15/964,625, filed Apr. 27, 2018, now issued as U.S. Pat. No. 10,758,928, which application is a continuation-in-part application of the earlier U.S. Utility Patent Application to Leavitt entitled "Sprinkler Head Cover," application Ser. No. 14/538,528, filed Nov. 11, 2014, now issued as U.S. patent Ser. No. 10/369,584, the disclosures of each of which are hereby incorporated entirely herein by reference.

BACKGROUND

1. Technical Field

Aspects of this document relate generally to devices and systems utilized in association with watering systems included in grassy areas, such as golf courses and lawns.

2. Background Art

Many conventional golf courses generally include several holes that are formed of grassy areas of varying grass types mowed to different heights that form rough, fairway, and green areas of a hole. Live grass is used in most conventional golf courses to form the grassy areas, and to maintain the specialized grass types used in each area of a golf course hole (particularly the green) an automatic watering system including sprinkler heads is often used. In grassy areas in parks and lawns, automatic watering systems may also be used, particularly in drier climates. Conventional sprinkler heads used in golf courses and lawns are included in a hole or depression in the grassy area and extend from ground level when water pressure is applied during operation and subsequently retract into the ground when the flow of water stops. A wide variety of conventional sprinkler types, sizes, and methods of operation may be utilized in various golf courses and lawns.

SUMMARY

Implementations of a sprinkler head cover may include an artificial turf portion including a backing, a stiffener coupled to the backing at a first side of the stiffener, and a volume-filling portion coupled to a second side of the stiffener. The second side may be opposite the first side. The volume-filling portion may be configured to substantially fill a volume of a hole between the stiffener and a top of a sprinkler head within the hole and support the stiffener above the sprinkler head.

Implementations of sprinkler head covers may include one, all, or any of the following:

The volume-filling portion may include a perimeter that corresponds with a perimeter of the hole.

A diameter of the volume-filling portion may be substantially equal to a diameter of a hole including a sprinkler head.

The volume-filling portion may be removably coupled to the stiffener.

The volume-filling portion may be removably coupled to the stiffener through a plurality of hook and loop fasteners.

The volume-filling portion may include a plastic polymer.

The volume-filling portion may include a rubber material.

The volume-filling portion may include either a wooden, composite, silicone, fiberglass, or a metallic material.

Implementations of a sprinkler head cover may include an artificial turf portion including a backing, a stiffener coupled to the backing at a first side of the stiffener, and a plastic polymer portion coupled to a second side of the stiffener. The second side may be opposite the first side. The plastic polymer portion may be configured to substantially fill a volume of a hole between the stiffener and a top of a sprinkler head within the hole and support the stiffener above the sprinkler head.

Implementations of sprinkler head covers may include one, all, or any of the following:

The plastic polymer portion may include a perimeter that corresponds with a perimeter of the hole.

A diameter of the plastic polymer portion may be substantially equal to a diameter of a hole including a sprinkler head.

The plastic polymer portion may be removably coupled to the stiffener.

The plastic polymer portion may be removably coupled to the stiffener through a plurality of hook and loop fasteners.

Implementations of a sprinkler head cover may include an artificial turf portion including a backing, a stiffener coupled to the backing at a first side of the stiffener, and a volume-filling portion coupled to a second side of the stiffener. The second side may be opposite the first side. The volume-filling portion may be configured to at least partially fill a volume of a hole between the stiffener and a top of a sprinkler head within the hole.

Implementations of sprinkler head covers may include one, all, or any of the following:

The volume-filling portion may be configured to substantially fill a volume of a hole between the stiffener and a top of a sprinkler head within the hole.

The volume-filling portion may be configured to support the stiffener above the sprinkler head.

The volume-filling portion may include a perimeter that corresponds with a perimeter of the hole.

A diameter of the volume-filling portion may be substantially equal to a diameter of a hole including a sprinkler head.

The volume-filling portion may be removably coupled to the stiffener.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

This disclosure, its aspects and implementations, are not limited to the specific components, assembly procedures or method elements disclosed herein. Many additional components, assembly procedures and/or method elements known in the art consistent with the intended sprinkler head covers and related methods will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for such sprinkler head covers and related methods, and implementing components and methods, consistent with the intended operation and methods.

Implementations of sprinkler head covers disclosed herein may include any feature, characteristic, aspect, detail, functionality, and the like, of any sprinkler head cover disclosed in U.S. Pat. No. 8,616,467, issued Dec. 31, 2013, titled "Sprinkler Head Cover," naming Gary Leavitt as first inventor, the disclosure of which is entirely incorporated herein by reference.

Figure 1:
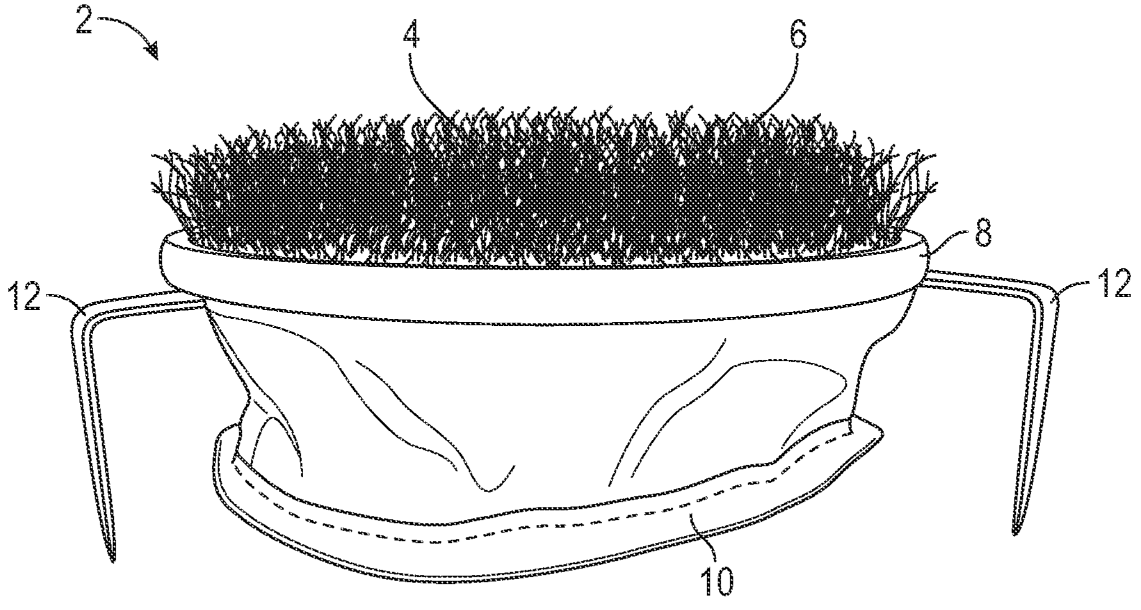
FIG. 1 is a side view of an implementation of a sprinkler head cover.

Referring to FIG. 1, an implementation of a sprinkler head cover 2 is illustrated. As illustrated, the cover 2 includes an artificial turf portion 4 that includes a plurality of fibers 6. Coupled to the artificial turf portion 4 over an edge 8 of the artificial turf portion 4 is a bag 10 made of any of a wide variety of fabric materials, including, by non-limiting example, polyesters, nylons, acrylics, polyolefins, rayon, acetate, aramids, and any other synthetic or natural fiber. As illustrated, in particular implementations, one or more spikes 12 may extend through openings in the bag 10 and include pointed ends that face away from the artificial turf portion 4.

Figure 3:
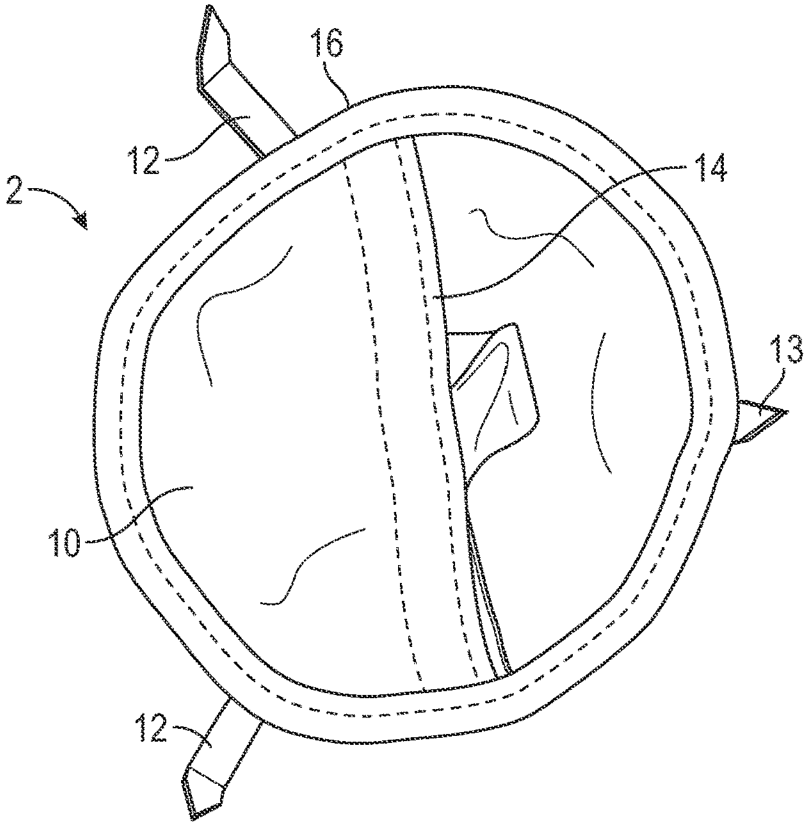
FIG. 3 is a bottom view of an implementation of a sprinkler head cover.

Referring to FIG. 3, a bottom view of the implementation of a sprinkler head cover 2 is illustrated. As illustrated, the cover 3 may include three spikes 12, 13 that may be arranged equal distances from each other along a circumference of the cover 2. While three spikes 12, 13 are illustrated, fewer or more spikes may be utilized in particular implementations. As will be discussed in more detail later in this document, the one or more spikes may be slidable and slidably coupled to the sprinkler head cover 2. As illustrated, spike 13 is in a retracted position while spikes 12 are slidably extended from an outer edge 16 of the cover 2 and are in an extended position.

While the implementation of a cover 2 illustrated in FIGS. 1 and 3 is substantially circular, other sprinkler head cover implementations may have any other desired shape, including, by non-limiting example, oval, elliptical, square, rectangular, triangular, or any other closed shape. As illustrated, the bag 10 may include at least one reclosable opening 14 therein. In the implementation illustrated, one reclosable opening 14 that bisects a majority of the bottom surface of the bag is included and is in a closed position. In other implementations, however, more than one reclosable opening could be included; multiple reclosable openings could be utilized, for example, when the bag consists of several internal compartments joined together.

Figure 4:
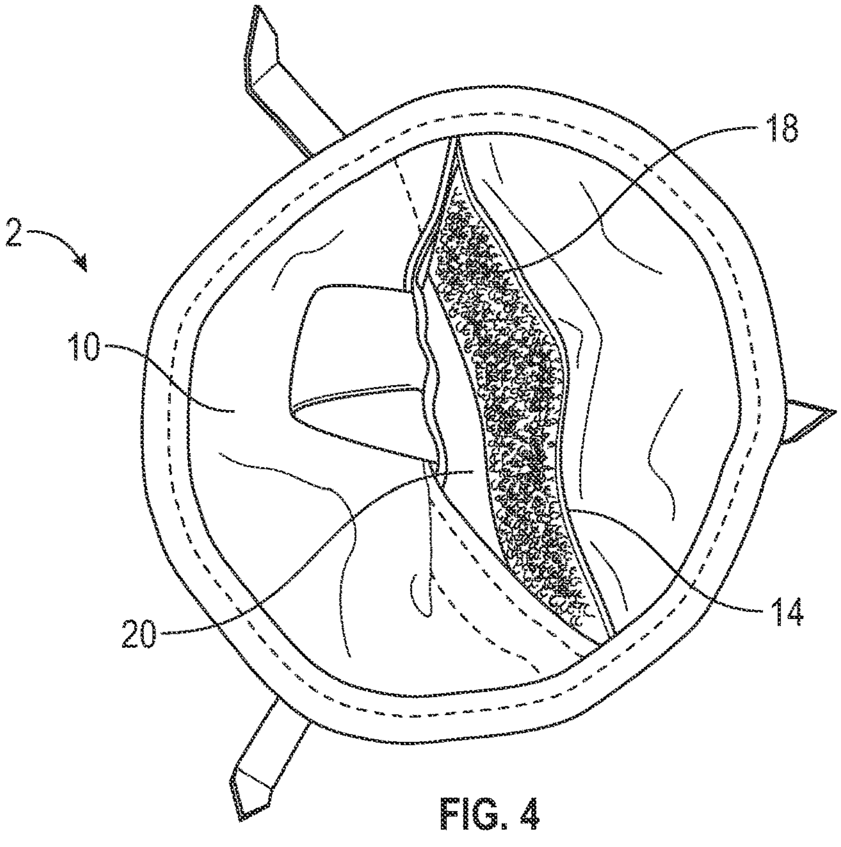
FIG. 4 is a bottom view of an implementation of a sprinkler head cover showing a reclosable opening in an open position.
Figure 5:
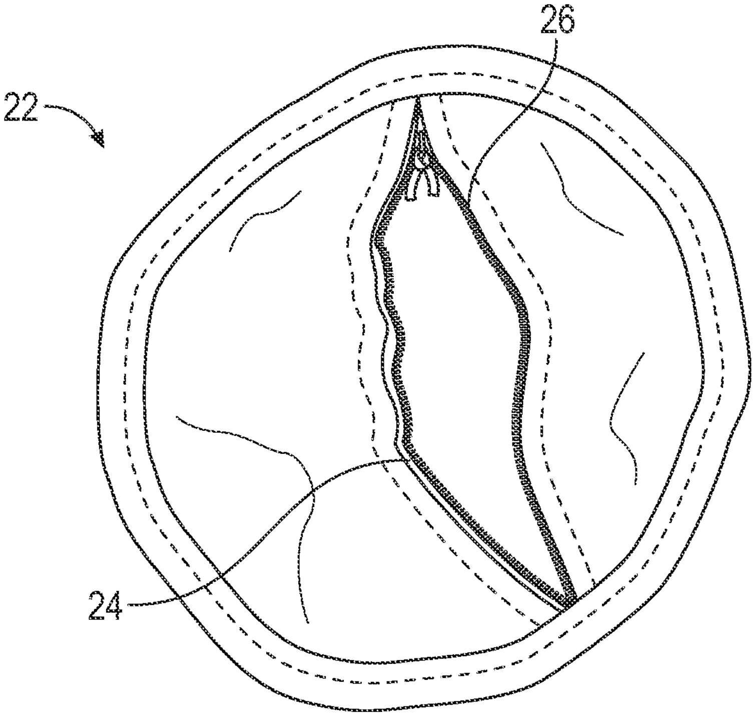
FIG. 5 is a bottom view of another implementation of a sprinkler head cover showing a reclosable opening in an open position.

FIG. 4 illustrates the sprinkler head cover 2 with the reclosable opening 14 in an open position revealing the interior cavity 20 enclosed by the bag 10. As illustrated, the reclosable opening 14 can be closed using hook and loop fastener 18, which may, in particular implementations, be that manufactured and marketed under the tradename Velcro® by Velcro USA, Inc. of Manchester, New Hampshire. As illustrated in FIG. 5, other implementations of sprinkler head covers 22 may include a reclosable opening 24 that utilizes a zipper 26 to close the opening. In other implementations, a wide variety of other fastener types may be utilized, including, by non-limiting example, snaps, buttons, adhesives, or any other structure or system adapted to hold two fabric portions together.

In particular implementations of sprinkler head covers 22, no spikes may be included, as in the implementation illustrated in FIG. 5. In other implementations of sprinkler head covers, however, a reclosable opening and/or a bag may not be included, and only spikes may be utilized. A wide variety of implementations are possible using the principles disclosed in this document.

Figure 6:
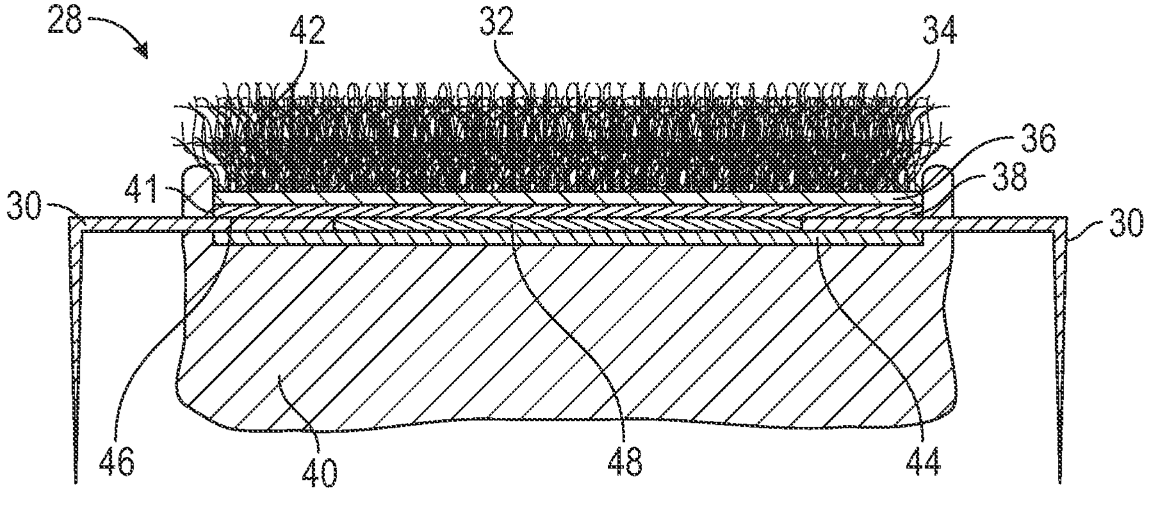
FIG. 6 is a cross section view of another implementation of a sprinkler head cover.

Referring to FIG. 6, a cross section view of another implementation of a sprinkler head cover 28 is illustrated. The cover 28 illustrated in FIG. 6, includes four spikes 30, each arranged as opposing pairs with one spike 30 on a side of the cover 28 and linearly aligned with each other. The cross section view taken in FIG. 6 is through the center of a pair of spikes 30. The cover 28 includes an artificial turf portion 32 that includes a plurality of fibers 34 coupled to a backing 36. The artificial turf portion 32 may be any of wide variety of conventional artificial grass types and may not include fill material. The backing 36 is coupled to a stiffener 38 to which the bag 40 is also coupled. The bag 40 may be coupled to the stiffener through any of a wide variety of techniques, including, by non-limiting example, sewing, gluing, thermal bonding, screwing, or any other coupling technique. In the implementation illustrated in FIG. 6, the fabric of the bag 40 is brought up over the edges 42 of the stiffener 38 and the artificial turf portion 32, placed against a first side 41 of the stiffener 38, and then sewn to the stiffener 38.

In implementations of covers 28 that include spikes 30, the spikes 30 may be slidably coupled to or within the cover 28 through use of a spike retainer 44 that is coupled to the stiffener 38. The spikes 30 may be retained against a second side 46 of the stiffener 38 and the spike retainer 44, allowing them to slide in a space 48 located between the stiffener 38 and the spike retainer 44. A wide variety of structures and systems may also be employed to prevent the spikes 30 from sliding all the way out of the cover 28. In a particular implementation, the stiffener may include a slot in which a screw is inserted that screws into a spike. Because the head of the screw is wider than the slot, the spike may be able to slide back and forth a distance substantially equal to the length of the slot (minus the width of the screw) while the screw prevents the spike from sliding past the end of the slot. In another implementation, the end of the spike within the cover may be curved toward the stiffener or toward the spike retainer. Because of the curve in the spike, the spike cannot fully slide out from between the stiffener and the spike retainer. In such an implementation, the spike retainer may take the form of a ring and the curved portion of the spike may not be able to through the gap between the edge of the ring shaped spike retainer and the stiffener. A wide variety of other structures and systems may be utilized in various implementations of sprinkler head covers to retain various spike implementations.

The artificial turf portion 32, the stiffener 38, and the spike retainer 44 may be coupled together through a wide variety of structures and systems in various implementations. In a particular implementation, a single screw may be inserted through the artificial turf portion, the stiffener, and the spike retainer and serve to hold all three portions together. In others, the artificial turf portion 32, the stiffener 38, and the spike retainer 44 may be coupled together collectively or as individual pairs through, by non-limiting example, gluing, thermal bonding, sewing, hook and loop fasteners, screws, snaps, or any other structure or method of coupling two planar pieces together.

A wide variety of materials may be utilized in various implementations of sprinkler head covers 2, 22, and 28 disclosed herein. In a particular implementation, the fabric of the bag may be a 1000D thread sized nylon marketed under the tradename Cordura® by INVISTA S.a.r.l. of Wichita, Kansas. The stiffener may be 0.093" thermoplastic marketed under the tradename Kydex by KYDEX, LLC of Bloomberg, Pennsylvania. The spikes may be made of 0.75 inch galvanized steel strap. A wide variety of other materials, such as, by non-limiting example, wood, rubbers, composites, ceramics, plastics, and any other desired material may be utilized in various implementations.

Figure 2:
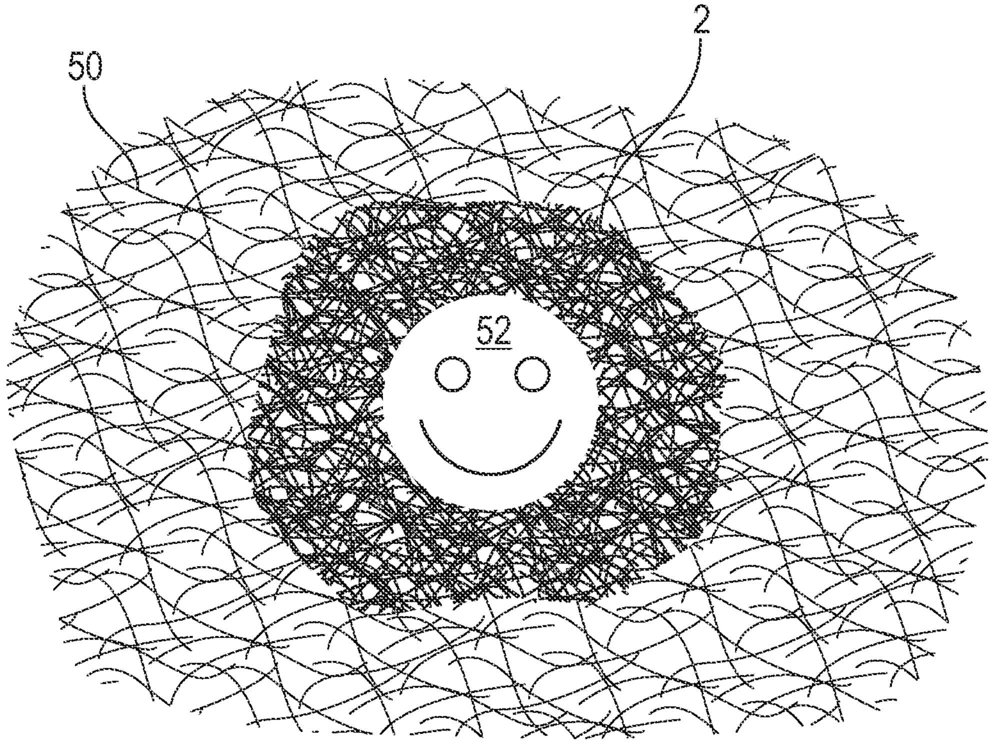
FIG. 2 is a top view of an implementation of a sprinkler head cover installed over a sprinkler head included in a grassy area.

Implementations of sprinkler head covers 2, 22, and 28 generally do what the name states—they fit into the holes or indentations in a grassy surface to bring the level of the hole or indentation up to the approximate level of the grassy surface. Particular implementations may also function to provide a firm surface, allowing a person to walk over the top of the sprinkler head without feeling substantial "give" or flexion when the person's foot is located on top. Referring to FIG. 2, a grassy surface 50 is illustrated with a sprinkler head cover 2 placed over a sprinkler head included in the surface 50. As can be seen from the picture, the visible artificial turf portion of the sprinkler head cover is substantially co extensive with the area of the hole (i.e., the hole is not visible beneath the cover). This grassy surface 50 could be in a lawn or the fairway of a golf course hole. When the grassy surface 50 is the fairway of a golf course hole, a hole containing a sprinkler head may be adjacent to the edge of the putting green. Because the putting green is designed for precision ball play, the design of the hole and the watering system generally avoids placing sprinkler heads within the perimeter of the green itself. In order to water the green, however, sprinkler heads are often placed adjacent the perimeter of the green and are directed at the green.

Because the sprinkler heads are placed in a hole or indentation, a golf ball cannot be putted directly across the top of a conventional sprinkler head. If a golf ball on the fairway has the sprinkler head hole between it and the flagstick, the player is forced to chip or lay-up to attempt to get the golf ball over the sprinkler head hole. In addition, during driving and chipping that takes place during game play, a golf ball may land on top of the sprinkler head. Because conventional sprinkler heads are made of plastic or other materials and rest in a hole, the golf ball does not generally bounce off the sprinkler head in a stable, predictable manner when compared to bouncing off the fairway or green. Accordingly, conventional sprinkler heads and the holes in which they are located on a golf course hole are a hazard to the player who is playing the hole. If the hole or indentation containing the sprinkler head is brought up to the approximate height of the surrounding grass using a sprinkler head cover, however, the effect of the sprinkler heads can be reduced, and putting over the top of a sprinkler head may be possible. In addition, if the structure of the sprinkler head cover is properly designed, particular implementations may allow for a more predictable bounce off the top of the sprinkler head cover which may approximate that off the fairway.

Implementations of sprinkler head covers 2, 22, and 28 may utilize various implementations of a method of covering a sprinkler head. The method may include opening a reclosable opening in a bag included in a sprinkler head cover which also includes a stiffener coupled to a backing of an artificial turf portion where the bag is coupled to the stiffener. The method may also include placing fill material within the bag, closing the reclosable opening, and placing the bag within a hole containing a sprinkler head in a retracted position where the hole is included in a grassy surface. Particular implementations of the method may also include adjusting a height of the artificial turf portion above the sprinkler head by removing the sprinkler head cover from the hole, opening the reclosable opening, adding additional or removing fill material from the bag, closing the reclosable opening, and replacing the bag within the hole. A wide variety of fill materials may be used to provided weight to implementations of sprinkler head covers, including, by non-limiting example, sand, lead shot, steel shot, gravel, or any other flowable material that can be contained within a bag.

In various method implementations, the method may also include engaging one or more spikes included in the sprinkler head cover with soil around the sprinkler head. In other implementations, the method may include adjusting the position of the one or more spikes by sliding the one or more spikes away or toward an outer edge of the sprinkler head cover where the one or more spikes are slidably engaged between the stiffener and a spike retainer coupled to the stiffener. Any of the various spike retainer implementations and spike implementations disclosed herein may be utilized. The method may also include adjusting a height of the artificial turf portion above the sprinkler head by pressing downwardly on the sprinkler head cover to push the one or more spikes into the soil until the artificial turf portion is substantially at the level of grass surrounding the sprinkler head. In these implementations, the sprinkler head cover may not include a bag at all, but may just use spikes to level and hold the sprinkler head cover to the earth.

Referring to FIG. 2, in various method implementations (and in various implementations of sprinkler head covers), the method may include applying an image 52 to the plurality of fibers included in the artificial turf portion of the sprinkler head cover. This may be accomplished in a variety of ways, including, by non-limiting example, spray painting, stencil painting, roller painting, applying decals, or any other method of creating an image on the plurality of fibers. The images created may be trademarks, company logos, pictures, names of particular locations (such as country clubs), advertising materials, or decorative images. A wide variety of image types may be utilized depending upon the venue in which a particular sprinkler head cover is located.

Referring now to FIGS. 7-12, in various implementations a sprinkler head cover 60 may be used to cover a hole in a grassy area where a sprinkler head is located when the sprinkler head is in a retracted position. The sprinkler head 60 includes a bag 78 similar in ways to those described above, having a reclosable opening 80 which may be a fastener 82 such as a hook and loop fastener 84. In other implementations it could be a zipper, one or more snaps, one or more buttons, or the like. An artificial turf portion 62 of the sprinkler head cover 60 is configured to be coextensive, or substantially coextensive, with an area of a hole having a sprinkler head in a grassy area. The bag 78 is configured to be filled, and in implementations is filled, with a fill material 88 which may comprise any of the fill materials disclosed herein with respect to other bags, including sand, lead shot, steel shot, gravel, and the like. In implementations the bag 78 could exclude a reclosable opening 80 and in such implementations the amount of content inside the bag 78 is not adjustable. For example the bag 78 could be, or could be similar to, a small bean bag that is filled with a fill material 88 but having no opening therein to remove or adjust the amount of fill material 88.

At times the sprinkler head cover 60 may be used with the bag 78 emptied of all the fill material 88. By non-limiting example, this may be useful when no fill material 88 is needed to bring up the sprinkler head cover 60 to a desired height. Similar to other bags described herein, the ability to adjust the contents of the bag 78 allows the height of the artificial turf portion 62 to be adjusted so that an upper surface 64 of the artificial turf portion 62 is even with grass that surrounds the sprinkler hole. This is useful at least in part because the depth of sprinkler holes (i.e., the depth from the top of the surrounding grass to the top of the sprinkler) may vary from hole to hole and from sprinkler to sprinkler. For some golf courses a sprinkler head cover 114 may be used, which is similar to sprinkler head cover 60 except without the bag 78 and stitching 86. Sprinkler head cover 114 may be used to cover a sprinkler when the depth from the top of the surrounding grass to the top of the sprinkler head is fairly shallow so that no bag 78 is needed to make the upper surface 64 generally level with and generally coplanar with the top of the surrounding grass.

The upper surface 64 is defined as plane generally formed by the upper ends of the individual artificial grass fibers of the artificial turf portion 62. Naturally, each grass fiber has a slightly different height than its neighbors, so that the top of each grass fiber does not necessarily end at the exact same point, but in the aggregate, the collective grass fibers each end at a point that creates a planar appearance to the artificial turf. As used herein, this plane is defined as a plane parallel with and located a distance from the backing 66 that is the average height of the individual grass fibers above the backing 66.

Figure 7:
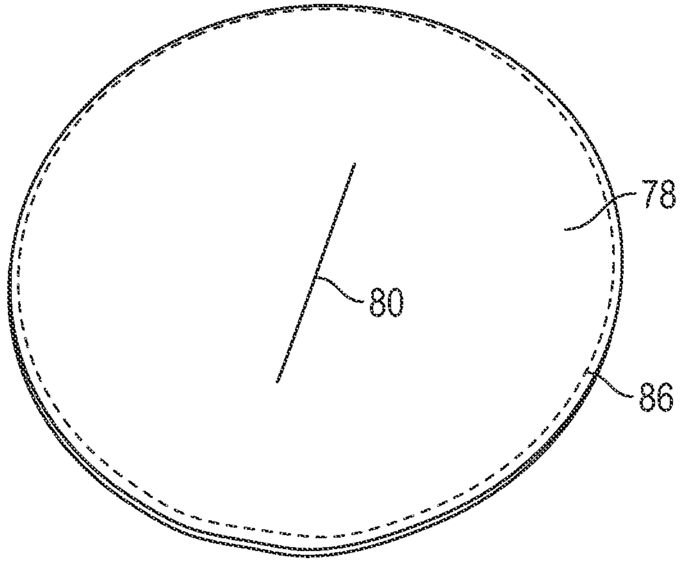
FIG. 7 is a bottom view of an implementation of a bag of a sprinkler head cover.
Figure 8:
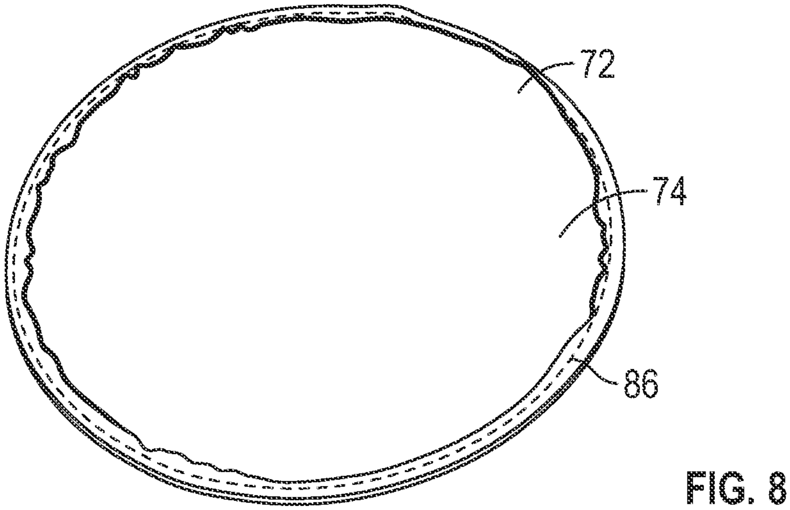
FIG. 8 is a top view of implementations of a stiffener and bag of a sprinkler head cover.
Figure 9:
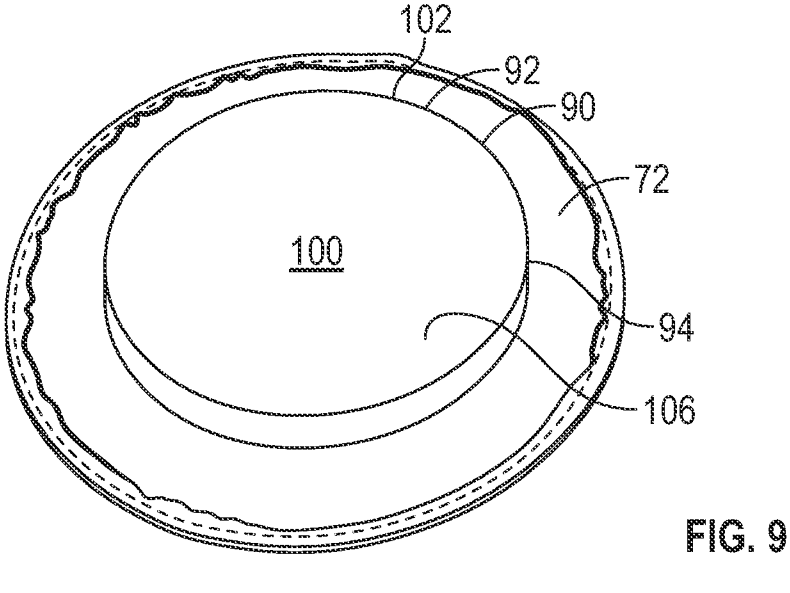
FIG. 9 is a top view of the elements of FIG. 8 with a foam insert added.
Figure 10:
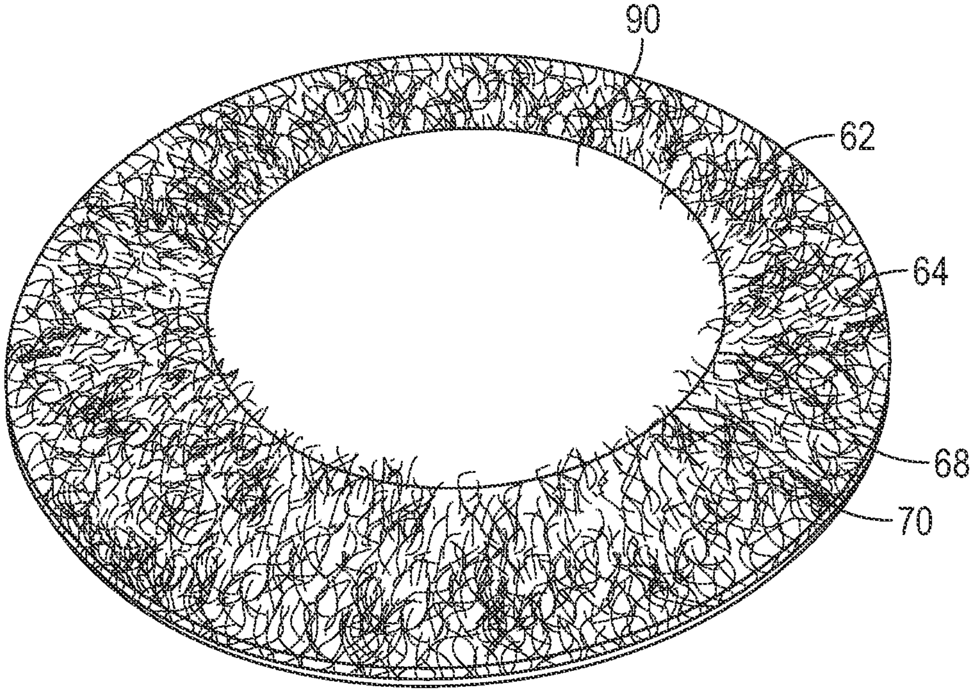
FIG. 10 is a top view of the elements of FIG. 9 with an artificial turf portion added.
Figure 12:
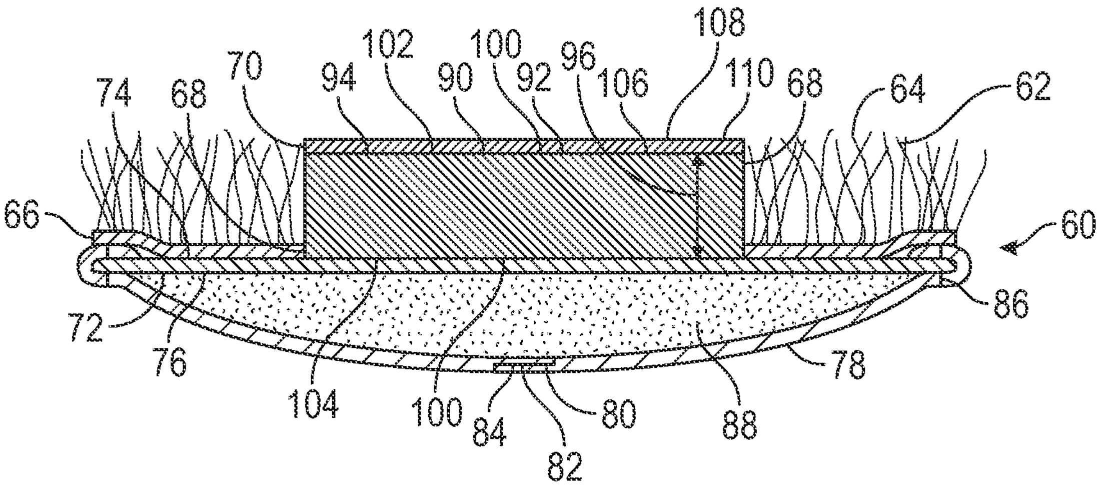
FIG. 12 is a cross section view of the sprinkler head cover of FIG. 11.

Referring to FIGS. 7, 8 and 12, the bag 78 may be formed of a single piece of material that is stitched to a first side 74 and a second side 76 of a stiffener 72 at an outer edge of the stiffener 72. In other implementations the bag 78 could be stitched only to the second side 76 of the stiffener 72 and or could include another piece of material that abuts the second side 76 so that the fill material 88 contacts only the bag 78 and not the second side 76 of the stiffener 72. Although stitching 86 is used in this implementation, in other implementations the bag 78 could be coupled to the stiffener 72 using glue, a melt bond, staples, hook and loop fasteners, a friction fit, and the like.

The stiffener 72 is formed of an at least semi-rigid material and provides rigidity and structure to the sprinkler head cover 60, though it may also have some flexibility. In implementations the stiffener 72 is formed of vinyl and/or linoleum, which is easy to cut and sturdy, yet flexible, and is able to be sewn through to couple the bag 78 to the stiffener 72 using the stitching 86. In other implementations the stiffener 72 may be formed of another material, such as a polymer, cardboard, or any other material disclosed herein for stiffeners for other sprinkler head covers.

Referring to FIGS. 10-13, the artificial turf portion 62 has an opening 70 all the way through, defining a hole 68. In implementations this hole 68 is generally located at a center of the artificial turf portion 62 though it could also be off-center and located in any location of the artificial turf portion 62. The hole 68 in the implementations shown has the shape of a right circular cylinder, though the perimeter of the hole could be any other regular or irregular closed shape.

Figure 13:
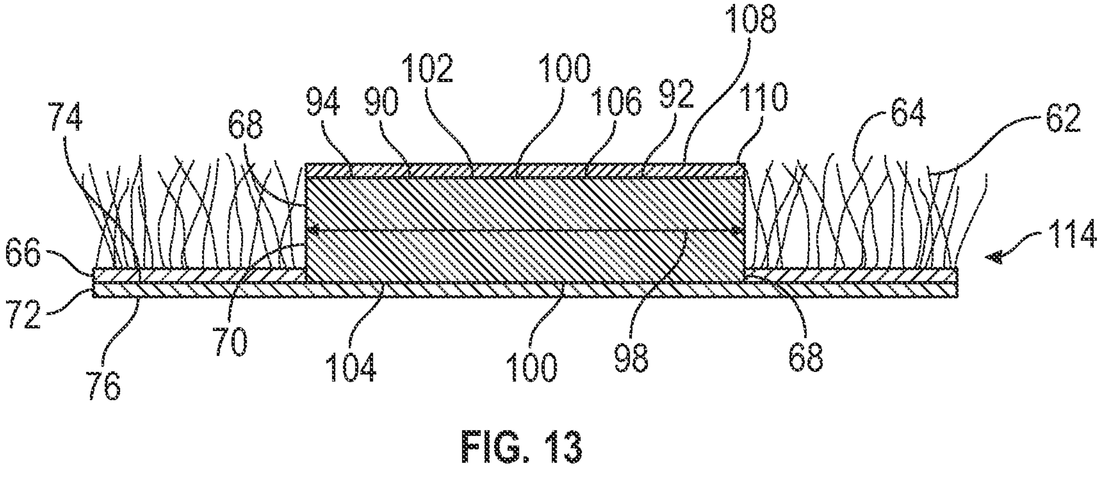
FIG. 13 is a cross section view of an implementation of a sprinkler head cover without a bag.

Referring to FIGS. 9-13, a foam insert 90 fits into the hole 68 of the artificial turf portion 62. Accordingly, the foam insert 90 has a shape that corresponds with the shape of the hole 68. The foam insert 90 is a closed shape 92 and in the implementations shown is a cylinder 94, which may be a right circular cylinder 102. In other implementations the foam insert 90 could have other shapes, such as any regular or irregular shape, any cylinder that is not a right circular cylinder (such as an oval or elliptical cylinder), or the like. The foam insert 90 is made of a foam material which adapted to ensure a desirable bounce of a golf ball when the golf ball strikes a second side 106 of the foam insert 90. Referring to FIGS. 12-13, in particular implementations the foam insert 90 has a height 96 that is smaller than a diameter 98 of the cylinder 94. This may allow the foam insert 90 to occupy more area of the sprinkler head cover 60, 114 than it otherwise would and may be desirable in instances wherein it is desirable that a golf ball striking the sprinkler head cover 60, 114 strikes the foam insert 90 portion instead of the artificial grass portion.

The cylinder 94 has two opposing faces 100, one on a first side 104 and another on a second side 106 opposing the first side 104. The first side 104 of the foam insert 90 is coupled to or, in implementations, is directly attached (as shown in the drawings) to the first side 74 of the stiffener 72 through the hole 68 or opening 70.

A label 108 may be placed atop the second side 106 of the foam insert 90. The label 108 may be a sticker 110, such that it attaches to the foam insert 90 using an adhesive, and may be removable (such as with a pressure sensitive adhesive analogous to the adhesive of sticky notes), though in other versions the sticker 110 or label 108 may be more permanently attached to the foam insert 90. Other attachment mechanisms may be used, for example the label 108 could be formed of a flexible magnet and another flexible magnet or other magnetically attractive material may be coupled to (or located beneath) the second side 106 of the foam insert 90 so that the label 108 attaches or otherwise couples thereto through magnetic force and remains in place until manually removed. The label 108 could also, by non-limiting example, be sewn, screwed, slid into a slot, attached with a friction fit, snapped in or coupled using any other method of slidably, removably, or fixedly coupling two items together.

Figure 11:
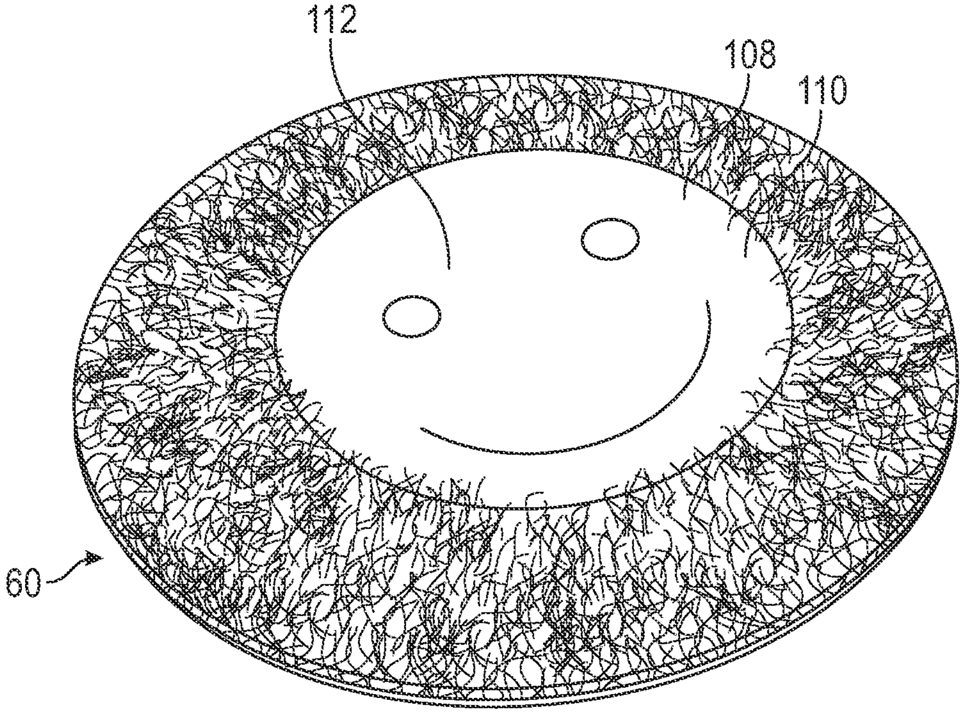
FIG. 11 is a top view of the elements of FIG. 10 with a label added.

Referring to FIG. 11, the label 108 may include an image 112. The image 112 may include any elements, such as a logo, a drawing, an illustration, words, letters, numbers, and the like, and may include advertising information. In FIG. 11 the image 112 is a smiley face. A user may swap out the foam insert 90 and replace it with another foam insert 90 to change the image 112 on one or more sprinkler head covers 60, 114, or may instead swap out the label 108 and replace it with another label 108 to change the image 112 on one or more sprinkler head covers 60, 114. This may be done, for example, to change advertising material for different events, for instance a first party may sponsor a first golf event and the images 112 may include the first party's logo and/or contact information, and then a second party may sponsor a second golf event and the images 112 in that case may be swapped out to show the logo and/or contact information of the second party. The sprinkler head covers 60, 114 are designed so that the label 108 is substantially level with the upper surface 64 of the artificial turf portion 62. In some implementations the label 108 covers all, or substantially all, of the second side 106 of the foam insert 90, or is otherwise coextensive or substantially coextensive with the second side 106 of the foam insert 90.

The hole 68 may be sized with a diameter matching or slightly larger than diameter 98 and may be sized to receive a foam insert 90 having a desirable size for a particular image 112 such as, by non-limiting example, a particular logo. In implementations diameter 98 is, or is about, six inches, though in other implementations it could be larger or smaller. In implementations the sticker 110 is a vinyl sticker. In implementations the foam insert 90 is a single piece of foam, though in other implementations it may include multiple pieces of foam, such as one main ⅝ inch piece and one or more thinner ⅛ inch layer pieces are added until the desired height is reached to make the top of the foam insert 90 flush, or substantially flush, with the upper surface 64 (or so that the label 108 is flush, or is substantially flush, with the upper surface 64).

In implementations the sprinkler head covers 60, 114 could be attached or otherwise coupled to the ground or top of a sprinkler head using magnets, hook and loop fasteners, a weighted base, spikes or anchors into the earth surrounding the sprinkler head, and/or they may simply lay atop the sprinkler head. In implementations one or more images may be placed directly on the grass of an artificial turf portion such as by screening, heat transfer, painting, or the like, or by attaching a patch or emblem thereon. While sprinkler head covers disclosed herein are generally sized to cover a hole of a sprinkler head, others may be sized differently such as to cover other larger or smaller items, such as a drainage head, an irrigation cover, a drainage cover or grate, and the like.

The sprinkler head covers 60, 114 may include features disclosed herein with respect to other sprinkler head covers such as, by non-limiting example, spikes and spike retainers disclosed herein, and the like. Some versions of sprinkler head covers may include a foam portion, similar to the foam insert 90, without any artificial grass. In such implementations there would be no artificial turf portion 62 (i.e., the foam portion covers the entire first side 74 of the stiffener 72). In implementations an all-foam sprinkler head cover may be used, i.e., a cover that excludes the stiffener 72, the bag 78, the artificial turf portion 62, and in implementations even the label 108, and just includes a foam portion that sits directly on the sprinkler head top with an image 112 being directly on an upper side of the foam portion. In other implementations a label 108 may be used for the image 112. Because there is no artificial turf portion 62 in these implementations, the image 112 on the foam portion may be larger than it otherwise would be, and may extend across the entire surface of the foam portion. In particular implementations, the version that includes only a foam portion with or without a label may include a soft edge on the foam portion. This soft edge may minimize the likelihood that a golf ball will be deflected if it encounters the edge of the foam portion.

Figure 14:
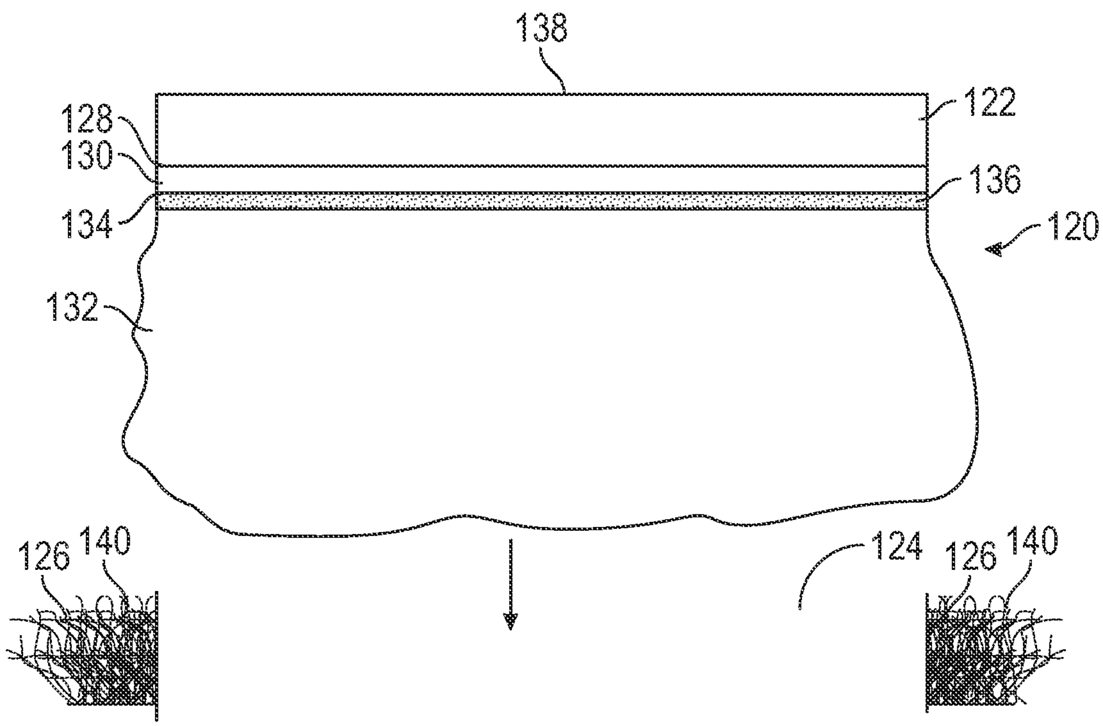
FIG. 14 is a cross section view of an implementation of a sprinkler head cover with a bag.

Referring to FIG. 14, a cross section view of an implementation of a sprinkler head cover with a bag is illustrated. In various implementations, the sprinkler head cover 120 may include a first foam portion 122. The first foam portion 122 may be any type of foam disclosed herein. In various implementations, the first foam portion is substantially coextensive with an area, or an opening, of hole 124 which may include a sprinkler head therein. In such implementations, the sprinkler head cover 120, including the first foam portion 124 may be configured to fit within and fill a volume of hole 124. Put another way, the diameter of the first foam portion 122 may be the same as or substantially the same as the diameter of the hole 124. The hole 124 may be in a grassy area 126.

Similar to other implementations disclosed herein, the first foam portion may be coupled to a first side 128 of a stiffener 130. The stiffener 130 may be any type of stiffener disclosed herein. In other implementations, however, the first foam portion 122 may be sufficiently stiff and no stiffener may be included. In still other implementations, the stiffener may be located within or enclosed within the first foam portion. The sprinkler head cover 120 may include a bag 132 coupled to a second side 134 of the stiffener 130. In various implementations, the bag 132 may be fixedly coupled to the stiffener 130, however, in other implementations, and as illustrated by FIG. 14, the bag may be removably coupled to the second side 134 of the stiffener 130. In implementations with no stiffener, the bag may be directly coupled to the first foam portion.

In a particular implementations, a plurality of hook and loop fasteners 136 may be located between the stiffener 130 and the removable bag 130 and may be used to removably coupled the bag to the stiffener. In other implementations, other fastening mechanisms may be used to removably couple the bag 132 to the stiffener 130, such as, by non-limiting example, snaps, clasps, ties, zippers, magnets, or any other fastening mechanism that allows reversible coupling and decoupling. In various implementations, the bag 132 may include a reclosable opening as previously disclosed herein and may be filled with any material previously disclosed herein. By adjusting the amount of fill in the bag, the sprinkler head cover 120 may be universal inasmuch as the cover can accommodate holes with various depths by adding or removing fill material to the bag 132 to change the height above the sprinkler head at which the top surface of the cover sits. Further, by having the ability to remove the bag 132, very shallow holes may be accommodated where just the stiffener and first foam portion are sufficient to bring the top surface 138 of the first foam portion 122 level with the top surface 140 of the surrounding grassy area 126. The removable bag 132 also allows for various sized/dimensioned bags to be coupled to the stiffener 130. In various implementations, the sprinkler head cover 120 may be part of a kit with multiple bags included within the kit, each bag having a different size/dimension to accommodate a differently sized/deep hole. In such implementations, the bags need not have reclosable openings. In various implementations, the diameter of the bag 132 may be configured to have substantially the same diameter as the hole 124 housing the sprinkler head. In various implementations, the first foam portion may be coupled to a label and the label may be configured to be substantially level with surface 140 of the grassy area 126. The label may be any type of label previously disclosed herein. In various implementations, the sprinkler head cover may include a second foam portion in place of the bag 132, similar to the implementations described in relation to FIG. 15. This second foam portion could, in some implementations, be used in combination with any reclosable bag design disclosed in this document.

In other implementations, rather than a first foam portion 122, the sprinkler head cover may include an artificial turf portion. The artificial turf portion includes a backing which may be coupled to the stiffener 130. The artificial turf portion may also be substantially coextensive with the area or the opening of the hole 124 in a way similar to the structure of the first foam portion 122. In implementations with the artificial turf portion, a foam layer may be coupled between the artificial turf portion and the stiffener. In various implementations, the artificial turf portion may include an opening therethrough as previously described herein. In such implementations, a foam insert, which may be part of the foam layer may extend through the opening as previously described herein. A label may be coupled to the exposed portion of the foam insert as previously disclosed herein.

Figure 15:
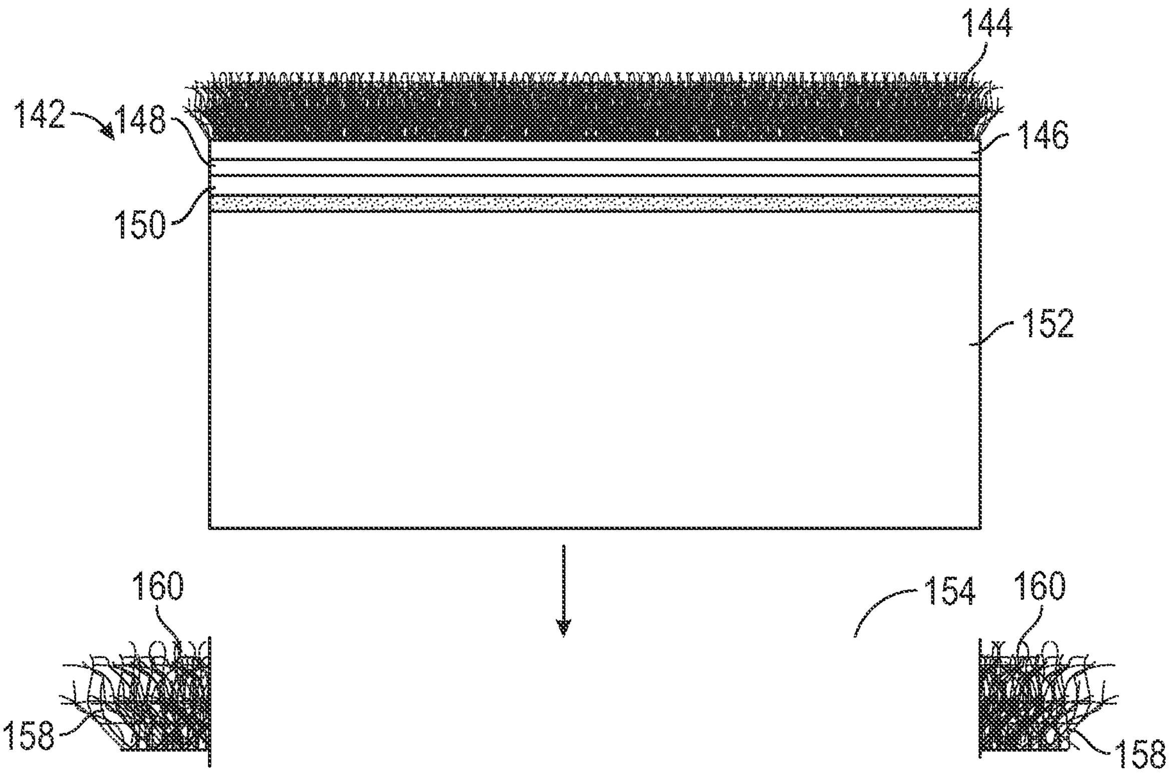
FIG. 15 is a cross section view of an implementation of a sprinkler head cover with a lower foam portion.

Referring to FIG. 15, a cross section view of an implementation of a sprinkler head cover with a lower foam portion is illustrated. In various implementations, the sprinkler head cover 142 may include an artificial turf portion 144 having a backing 146 similar to or the same as any artificial turf portion disclosed herein. In implementations having the artificial turf portion, the sprinkler head cover 142 may include a foam layer 148 coupled between the artificial turf portion and a stiffener 150. In various implementations, the artificial turf portion 144 may also include an opening therein with a foam insert, which may be part of the foam layer 148, extending therethrough as previously described herein. The stiffener 150 may be included with the sprinkler head cover and may be the same as or similar to any stiffener disclosed herein. In other implementations, no stiffener is necessary as the foam portion 152 may be sufficiently rigid to be directly coupled to the backing 146 of the artificial turf portion 144 or foam layer 148.

In various implementations, and as illustrated by FIG. 15, the sprinkler head cover 142 may include a foam portion 152. In implementations with a foam portion in place of the artificial turf portion 144, the foam portion 152 may be considered a second foam portion or a lower foam portion. The foam portion 152 may be configured to fill a volume of a hole 154 between the stiffener 150 and a top of a sprinkler head within the hole 154. In such implementations, a perimeter of the foam portion 152 may correspond with a perimeter of the hole 154. Similarly, a diameter of the foam portion 152 may be substantially equal to the diameter of the hole 154. The foam portion 152 may support the stiffener 150 above the sprinkler head, resting on the sprinkler head and/or against the walls of the hole thereby keeping the upper surface of the artificial turf portion level with the upper surface 160 of the surrounding grassy area 158.

In various implementations, the foam portion 152 may include any type of foam or material disclosed herein. In particular implementations, the foam portion 152 may be configured to retain its shape when molded into a particular shape. In such implementations, if the foam portion 152 is taller than a depth of the hole, the foam portion may be shaped, or compressed, until it is the right depth to fill the volume of the hole between the top of the sprinkler head and the stiffener 150. In various implementations, the foam portion 152 may be removable from the remainder of the sprinkler head cover 142 and be removably coupled thereto. In such implementations, the removable foam portion may be removably coupled to the stiffener using any removable fastening mechanism disclosed herein. Because the foam portion 152 may be removable, different sizes of foam portions may be coupled to the stiffener in order to accommodate different depths of holes housing sprinkler heads. In various implementations, the sprinkler head cover may be part of a kit including multiple foam portions all of differing sizes (some duplicate sizes may be included in some implementations as well). Further, the multiple foam portions may vary in types of foam in order to accommodate different environments of use of the sprinkler head cover.

In other implementations, the sprinkler head cover may include a volume-filling portion in place of the foam portion of FIG. 15 or the bag 132 of FIG. 14. The volume-filling portion may be essentially the same as either the foam portion 152 of FIG. 15 and/or the bag 132 of FIG. 14, with the only difference being that the volume-filling portion may include something other than foam or a bag. In particular implementations, the volume-filling portion may include a plastic polymer, a rubber, a silicone, a wooden material, a composite material, a metallic material, fiberglass, or any other material capable of at least partially filling a volume of a hole and coupling to the remainder of the sprinkler head cover. In particular implementations, the volume-filling portion may be configured to at least partially fill a volume of a hole between the stiffener and a top of a sprinkler head within the hole. In other implementations, the volume-filling portion may be configured to substantially fill a volume of a hole between the stiffener and a top of a sprinkler head within the hole. In such implementations, the volume-filling portion may be configured to support the stiffener above the sprinkler head. The volume-filling portion may be used in implementations having a turf layer on top of the sprinkler head cover (as is illustrated by FIG. 15) or in implementations having a foam portion on top of the sprinkler head cover (as is illustrated by FIG. 14). In various implementations, the bag 132 of FIG. 14 and/or the foam portion 152 of FIG. 15 may be considered volume-filling portions.

In places where the description above refers to particular implementations of sprinkler head covers and related methods and implementing components, sub-components, methods and sub-methods, it should be readily apparent that a number of modifications may be made without departing from the spirit thereof and that these implementations, implementing components, sub-components, methods and sub-methods may be applied to other sprinkler head covers and related methods.

What is claimed is:

1. A sprinkler head cover comprising:

an artificial turf portion comprising a backing, the artificial turf portion comprising an opening therethrough;

a stiffener coupled to the backing at a first side of the stiffener;

an image portion coupled over the stiffener and within the opening; and a volume-filling portion coupled to a second side of the stiffener, the second side opposite the first side;

wherein the volume-filling portion is configured to at least partially fill a volume of a hole between the stiffener and a top of a sprinkler head within the hole and support the stiffener above the sprinkler head.

2. The cover of claim 1, wherein the volume-filling portion comprises a perimeter that corresponds with a perimeter of the hole.

3. The cover of claim 1, wherein a surface of the image portion is substantially level with an upper surface of the artificial turf portion.

4. The cover of claim 1, wherein the volume-filling portion is removably coupled to the stiffener.

5. The cover of claim 1, wherein the image portion comprises a removable label comprising an image.

6. The cover of claim 1, wherein the image portion comprises advertising material thereon.

7. A sprinkler head cover comprising:

an artificial turf portion comprising a backing;

a stiffener coupled to the backing at a first side of the stiffener;

an image displayed over the stiffener; and a volume-filling portion coupled to a second side of the stiffener, the second side opposite the first side;

wherein the volume-filling portion is configured to at least partially fill a volume of a hole between the stiffener and a top of a sprinkler head within the hole and support the stiffener above the sprinkler head.

8. The cover of claim 7, wherein the volume-filling portion comprises a perimeter that corresponds with a perimeter of the hole.

9. The cover of claim 7, wherein a diameter of the volume-filling portion is substantially equal to a diameter of a hole comprising a sprinkler head.

10. The cover of claim 7, wherein the volume-filling portion is removably coupled to the stiffener.

11. The cover of claim 7, wherein the image is formed in the artificial turf portion.

12. The cover of claim 7, wherein the artificial turf portion comprises an opening therein, wherein the image is displayed in the opening.

13. The cover of claim 7, wherein the image is displayed on a label coupled to the artificial turf portion.

14. The cover of claim 7, wherein the image comprises advertising material.

15. A sprinkler head cover comprising:

an artificial turf portion comprising a backing;

a stiffener coupled to the backing at a first side of the stiffener;

an image portion coupled over the stiffener; and a volume-filling portion coupled to a second side of the stiffener, the second side opposite the first side;

wherein the volume-filling portion is configured to at least partially fill a volume of a hole between the stiffener and a top of a sprinkler head within the hole and support the stiffener above the sprinkler head.

16. The cover of claim 15, wherein the image portion is directly coupled to the stiffener.

17. The cover of claim 15, wherein the image portion comprises a label removably coupled to a foam layer.

18. The cover of claim 15, wherein the volume-filling portion is removably coupled to the stiffener.

19. The cover of claim 15, wherein the image portion comprises a removable label comprising an image.

20. The cover of claim 15, wherein the image portion comprises advertising material.

* * * * *